US008021724B2

(12) United States Patent
Ikeda

(10) Patent No.: US 8,021,724 B2
(45) Date of Patent: Sep. 20, 2011

(54) OPTICAL FILM, MANUFACTURING METHOD OF THE SAME, AND POLARIZING PLATE AND LIQUID CRYSTAL DISPLAY USING THE OPTICAL FILM

(75) Inventor: Tsuyoshi Ikeda, Kobe (JP)

(73) Assignee: Konica Minolta Opto, Inc., Tokyo (JP)

( * ) Notice: Subject to any disclaimer, the term of this patent is extended or adjusted under 35 U.S.C. 154(b) by 1052 days.

(21) Appl. No.: 11/509,777

(22) Filed: Aug. 25, 2006

(65) Prior Publication Data

US 2007/0048460 A1 Mar. 1, 2007

(30) Foreign Application Priority Data

Aug. 30, 2005 (JP) .................................. 2005-249641

(51) Int. Cl.
*G02F 1/13363* (2006.01)

(52) U.S. Cl. ......................................... 428/1.3; 349/118

(58) Field of Classification Search ................... 428/1.1, 428/1.3, 1.31; 349/115, 117–118, 121
See application file for complete search history.

(56) References Cited

U.S. PATENT DOCUMENTS

| | | | | |
|---|---|---|---|---|
| 2,897,544 A | * | 8/1959 | Marks ............................ | 156/494 |
| 3,304,190 A | * | 2/1967 | Wielicki et al. ............ | 106/170.51 |
| 4,001,127 A | * | 1/1977 | Megumi et al. ............ | 252/62.9 R |
| 4,230,768 A | * | 10/1980 | Hamada et al. ................ | 428/352 |
| 4,427,741 A | * | 1/1984 | Aizawa et al. ................. | 428/332 |
| 5,032,000 A | * | 7/1991 | Shingaki et al. .............. | 385/124 |
| 5,148,205 A | * | 9/1992 | Guilino et al. ................ | 351/159 |
| 5,234,748 A | * | 8/1993 | Demiryont et al. ........... | 428/216 |
| 5,248,545 A | * | 9/1993 | Proscia ......................... | 428/212 |
| 5,459,613 A | * | 10/1995 | Xu ................................ | 359/653 |
| 5,753,140 A | * | 5/1998 | Shigemura ............... | 252/299.01 |
| 5,914,073 A | * | 6/1999 | Kobayashi et al. ........... | 252/585 |
| 6,476,892 B2 | * | 11/2002 | Aminaka ...................... | 349/117 |
| 6,549,254 B1 | * | 4/2003 | Grupp et al. .................. | 349/115 |
| 6,583,930 B1 | * | 6/2003 | Schrenk et al. ............... | 359/495 |
| 6,778,242 B1 | * | 8/2004 | Murayama et al. ........... | 349/117 |
| 6,894,751 B2 | * | 5/2005 | Payne et al. ................... | 349/117 |
| 6,964,795 B2 | * | 11/2005 | Elman et al. ................... | 428/1.3 |
| 6,974,608 B2 | * | 12/2005 | Shimizu et al. .............. | 428/1.33 |
| 7,019,130 B2 | * | 3/2006 | Ito ................................... | 536/69 |

(Continued)

FOREIGN PATENT DOCUMENTS

JP 04-127103 4/1992

(Continued)

OTHER PUBLICATIONS

JPO Website Machine English Translation of JP 2006-188718, Murayama et al., Jul. 20, 2006.*

*Primary Examiner* — Sophie Hon
(74) *Attorney, Agent, or Firm* — Finnegan, Henderson, Farabow, Garrett & Dunner, L.L.P.

(57) ABSTRACT

An optical film having an inner portion exhibiting an N value defined by the following equation smaller than an N value at a surface of the optical film:

$$N=(nx+ny)/2-nz$$

wherein nx represents an in-plane refractive index in a slow axis direction of the optical film, ny represents an in-plane refractive index in a fast axis direction of the optical film, and nz represent a refractive index in a thickness direction of the optical film.

16 Claims, 3 Drawing Sheets

U.S. PATENT DOCUMENTS

| | | | |
|---|---|---|---|
| 7,078,078 B2 * | 7/2006 | Ito | 428/1.1 |
| 7,125,918 B2 * | 10/2006 | Shimizu et al. | 524/37 |
| 7,166,321 B2 * | 1/2007 | Ogawa et al. | 427/162 |
| 2001/0026338 A1 * | 10/2001 | Aminaka | 349/117 |
| 2002/0102369 A1 * | 8/2002 | Shimizu et al. | 428/1.33 |
| 2004/0001175 A1 * | 1/2004 | Ito | 349/117 |
| 2004/0036828 A1 * | 2/2004 | Aminaka et al. | 349/117 |
| 2004/0052977 A1 * | 3/2004 | Ogawa et al. | 428/1.1 |
| 2005/0056811 A1 * | 3/2005 | Nishikawa et al. | 252/299.01 |
| 2005/0095373 A1 * | 5/2005 | Ito | 428/1.3 |
| 2005/0117090 A1 * | 6/2005 | Ito | 349/96 |
| 2005/0142304 A1 * | 6/2005 | Kawanishi et al. | 428/1.31 |
| 2005/0162592 A1 * | 7/2005 | Hirakata et al. | 349/119 |
| 2005/0168669 A1 * | 8/2005 | Nakamura | 349/96 |
| 2005/0181146 A1 * | 8/2005 | Yoneyama et al. | 428/1.31 |
| 2005/0207016 A1 * | 9/2005 | Ando | 359/586 |
| 2006/0040070 A1 * | 2/2006 | Ito et al. | 428/1.31 |
| 2006/0203159 A1 * | 9/2006 | Kawamoto et al. | 349/117 |
| 2006/0268200 A1 * | 11/2006 | Ohgaru et al. | 349/97 |
| 2007/0036916 A1 * | 2/2007 | Fujisawa et al. | 428/1.3 |
| 2007/0040963 A1 * | 2/2007 | Maruyama et al. | 349/96 |

FOREIGN PATENT DOCUMENTS

| | | |
|---|---|---|
| JP | 2003-301049 | 10/2003 |
| JP | 2005-105139 | 4/2005 |
| JP | 2005-105140 | 4/2005 |
| JP | 2005-139304 | 6/2005 |
| JP | 2005-139764 | 6/2005 |
| JP | 2005-156642 | 6/2005 |

* cited by examiner

OPTICAL FILM, MANUFACTURING METHOD OF THE SAME, AND POLARIZING PLATE AND LIQUID CRYSTAL DISPLAY USING THE OPTICAL FILM

This application is based on Japanese Patent Application No. 2005-249641 filed on Aug. 30, 2005, in Japanese Patent Office, the entire content of which is hereby incorporated by reference.

FIELD OF THE INVENTION

The present invention relates to an optical film, a method for producing the optical film, a polarizing plate using the optical film as a protecting film and a liquid crystal display using the polarizing plate.

BACKGROUND OF THE INVENTION

Recently, liquid crystal display widely used for displaying element is constituted by a liquid crystal layer and a polarizing plate. The polarizing plate is constituted by arranging a transparent protecting layer on both sided of the polarizing film. The liquid crystal cell includes a liquid crystal layer and a substrate sandwiching the liquid crystal layer. In the case of a transmission type liquid crystal display, the polarizing plates are arranged on both sides of the liquid crystal cell. Various displaying modes such as TN (twisted nematic), VA (vertically aligned), IPS (in-plane switching) and OCB (optically compensatory bend) have bee proposed for the liquid crystal cell.

Regarding the liquid crystal display, there is a problem such as that the displaying ability is lowered when the displayed image is viewed in an oblique direction even though the image is suitably viewed when the image is viewed from the front of the display because the liquid crystal material and the polarizing plate each has anisotropism. Accordingly, various optical films for expanding the viewing angle of the liquid crystal display have been proposed; cf. Patent Documents 1 through 5.

Hitherto, the double refraction of the optical film is controlled for obtaining the desired viewing angle of the liquid crystal display. However, the birefringence required to the optical film is different depending on the displaying mode of the liquid crystal cell. Consequently, the birefringence cannot be sufficiently controlled by the usual method for controlling the birefringence of the optical film and the sufficient viewing angle cannot be provided.

Patent Document 1: Japanese Patent Publication Open to Public Inspection (hereafter referred to as JP-A) No. 4-127103
Patent Document 2: JP-A No. 2005-105139
Patent Document 3: JP-A No. 2005-105140
Patent Document 4: JP-A No. 2005-139304
Patent Document 5: JP-A No. 2005-139764

SUMMARY OF THE INVENTION

An object of the present invention is to provide a display exhibiting a desired viewing angle, a polarizing plate and an optical film to be used in the display.

One of the aspects of the present invention is an optical film having an inner portion exhibiting an N value defined by the following equation smaller than an N value at a surface of the optical film:

$$N=(nx+ny)/2-nz$$

wherein nx represents an in-plane refractive index in a slow axis direction of the optical film, ny represents an in-plane refractive index in a fast axis direction of the optical film, and nz represent a refractive index in a thickness direction of the optical film.

DESCRIPTION OF THE PREFERRED EMBODIMENTS

Figure 1:
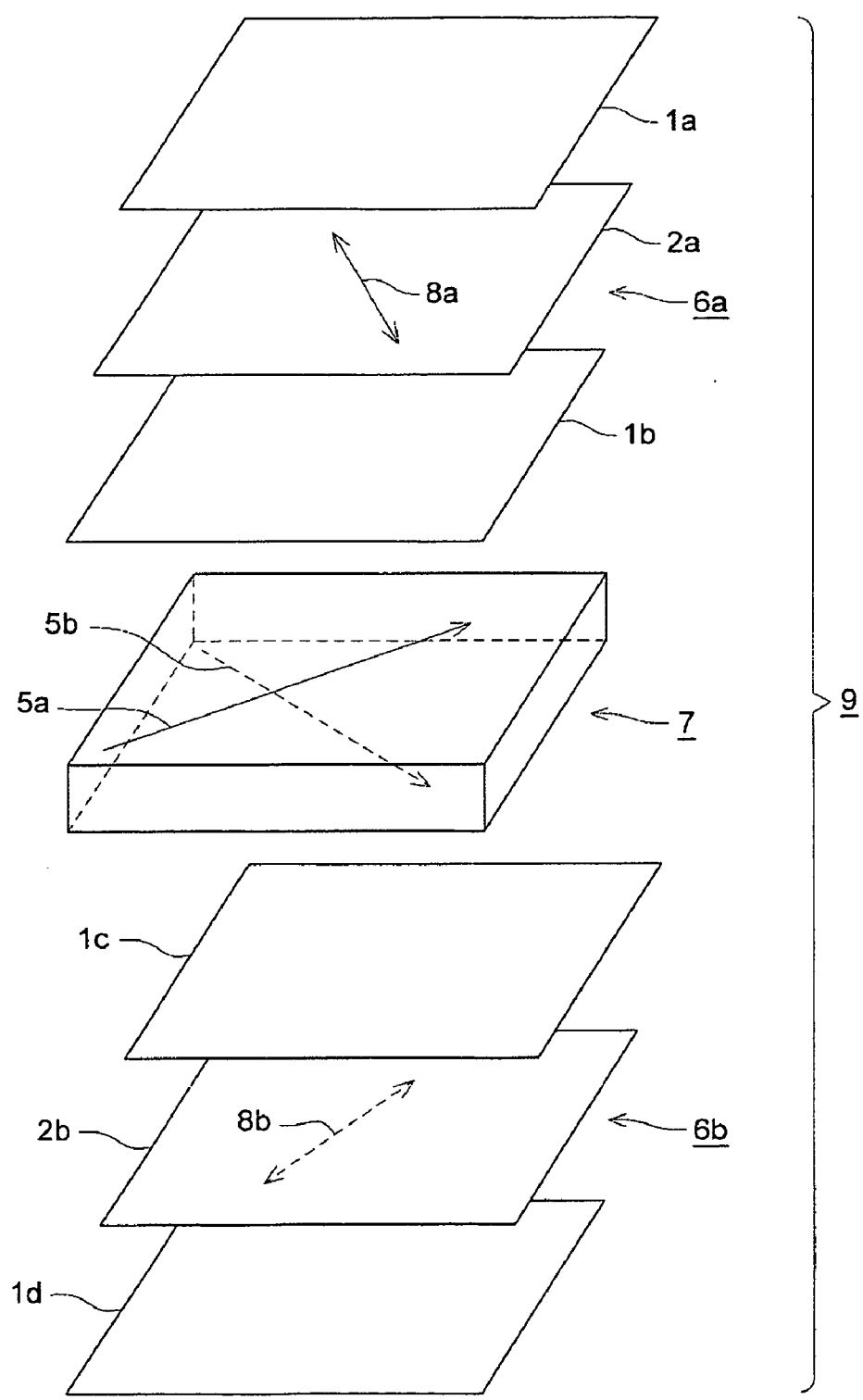
FIG. 1 shows a schematic drawing of the transmission type liquid crystal display 9 according to the present invention.

The above object of the present invention is achieved by the following structures.

(1) An optical film having an inner portion exhibiting an N value defined by the following equation smaller than an N value at a surface of the optical film:

$$N=(nx+ny)/2-nz$$

wherein nx represents an in-plane refractive index in a slow axis direction of the optical film, ny represents an in-plane refractive index in a fast axis direction of the optical film, and nz represent a refractive index in a thickness direction of the optical film.

(2) The optical film of Item (1), wherein the optical film meets the following conditions:

$$N(a1) \geq N(a2)$$

$$0 \leq a1 < a2 \leq d/2$$

wherein a1 and a2 each represent a depth from the surface of the optical film, d represents a thickness of the optical film, $N(a1)$ represents an N value at a depth a1 from the surface, and $N(a2)$ represents an N value at a depth a2 from the surface.

(3) The optical film of Item (1), wherein the optical film meets the following conditions:

$$N(0-a1) \geq N(a2-a3)$$

$$0 < a1 \leq a2 \leq a3 \leq d/2$$

wherein a1, a2 and a3 each represent a depth from the surface of the optical film, d represents a thickness of the optical film, $N(1-a1)$ represents an average N value in a depth range of 0 to a1 from the surface, and $N(a2-a3)$ represents an average N value in a depth range of a2 to a3 from the surface.

(4) The optical film of Item (3), wherein the optical film meets the following condition:

$$-10 < N(0-a1)/N(a2-a3) < 0$$

(5) The optical film of Item (2), wherein the depth a1 is not more than 5 μm.

(6) The optical film of Item (1), wherein the optical film meets the following conditions:

$$N(0) \geq N(a)$$

$$-10 \leq N(0)/N(a) < 0$$

$$0 < a \leq d/2$$

wherein a represents a depth from the surface of the optical film;

d represents a thickness of the optical film;

N(0) represents an N value at a depth 0 from the surface; and

N(a) represents an N value at a depth a from the surface.

(7) The optical film of Item (1), wherein a thickness of the optical film is not less than 15 μm;

an N value in a depth range of not less than 0 but less than 5 m from the surface of the optical film is 0 to $5 \times 10^{-4}$;

an N value in a depth range of 5 μm or more from the surface of the optical film is $-5 \times 10^{-4}$ to 0.

(8) The optical film of any one of Items (1) to (7), wherein Re value of the optical film is 0 to 10 nm, Re representing an in-plane retardation value defined by the following equation:

$$Re = (nx - ny) \times d$$

wherein nx represents an in-plane refractive index in a slow axis direction of the optical film; ny represents an in-plane refractive index in a fast axis direction of the optical film; and d represents a thickness of the optical film.

(9) The optical film of any one of Items (1) to (8) comprising a cellulose ester.

(10) The optical film of Item (9), wherein the optical film is formed using a solution comprising at least one of the solvents selected from the group consisting of an ether having 3 to 12 carbon atoms in the molecule, a ketone having 3 to 12 carbon atoms in the molecule and an ester having 3 to 12 carbon atoms in the molecule.

(11) The optical film of any one of Items (1) to (8) comprising at least one of the polymers selected from the group consisting of polynorbornene, polycarbonate, polyacrylate, polyester and polysulfone.

(12) The optical film of any one of Items (1) to (11), wherein the optical film is produced by a solution casting method; and a width of the optical film is 1.4 to 4.0 m.

(13) A method to produce the optical film of any one of Items (1) to (12) comprising the steps of:

casting a dope comprising a polymer and a solvent on a support to form a gel film having a self-standing nature; and peeling the gel film from the support.

(14) A polarizing plate comprising a polarizing film and transparent protective films provided on both surfaces of the polarizing film, wherein one of the transparent protective films is the optical film of any one of Items (1) to (12).

(15) A liquid crystal display comprising:

a liquid crystal cell comprising a liquid crystal layer and a pair of substrates provided on both surfaces of the liquid crystal layer; and a pair of polarizing plates provided on both surfaces of the liquid crystal cell, each of the polarizing plates comprising a polarizing film and transparent protective films provided on both surfaces of the polarizing film, wherein a transparent protective film of one of the polarizing plates is the optical film of any one of Items (1) to (12), the transparent protective film being provided closer to the liquid crystal cell than the other transparent protective film.

(16) A liquid crystal display comprising:

a liquid crystal cell comprising a liquid crystal layer and a pair of substrates provided on both surfaces of the liquid crystal layer; and a pair of polarizing plates provided on both surfaces of the liquid crystal cell, each of the polarizing plates comprising a polarizing film and transparent protective films provided on both surfaces of the polarizing film, wherein a first transparent protective film is the optical film of any one of Items (1) to (12), the first transparent protective film being provided on a surface closer to the liquid crystal cell of one of the pair of polarizing plates; and a second transparent protective film exhibits an in-plane retardation value: Re2, represented by the following equation, of 150 to 300 nm, and a retardation value in the thickness direction: Rt2, represented by the following equation, of −20 to 20 nm, the second transparent protective film being provided on a surface closer to the liquid crystal cell of the other polarizing plate:

$$Re2 = (nx2 - ny2) \times d2$$

$$Rt2 = ((nx2 + ny2)/2 - nz) \times d2$$

wherein nx2 represents an in-plane refractive index in a slow axis direction of the second transparent protective film;

ny2 represent an in-plane refractive index in a fast axis direction of the second transparent protective film;

nz2 represent a refractive index in a thickness direction of the second transparent protective film; and d2 represents a thickness of the second transparent protective film.

(17) A liquid crystal display comprising:

a liquid crystal cell comprising a liquid crystal layer and a pair of substrates provided on both surfaces of the liquid crystal layer; and a pair of polarizing plates provided on both surfaces of the liquid crystal cell, each of the polarizing plates comprising a polarizing film and transparent protective films provided on both surfaces of the polarizing film, wherein a first transparent protective film is the optical film of Item (16), the first transparent protective film being provided on a surface closer to the liquid crystal cell of one of the pair of polarizing plates;

a second transparent protective film exhibits an in-plane retardation value Re2 represented by the following equation of 150 to 300 nm, and a retardation value in the thickness direction Rt2 represented by the following equation of −20 to 20 nm, the second transparent protective film being provided on a surface closer to the liquid crystal cell of the other polarizing plate; and the second transparent protective film comprises the optical film of claim 1 as a substrate having thereon a liquid crystal compound, the orientation of the liquid crystal compound being fixed:

$$Re2 = (nx2 - ny2) \times d2$$

$$Rt2 = ((nx2 + ny2)/2 - nz) \times d2$$

wherein nx2 represents an in-plane refractive index in a slow axis direction of the second transparent protective film;

ny2 represent an in-plane refractive index in a fast axis direction of the second transparent protective film;

nz2 represent a refractive index in a thickness direction of the second transparent protective film;

a represents a depth from the surface of the optical film; and d2 represents a thickness of the second transparent protective film.

(18) The liquid crystal display of any one of Items (15) to (17), wherein the liquid crystal cell is driven by an IPS mode.

(19) The liquid crystal display of any one of Items (15) to (17), wherein the liquid crystal cell is driven by a VA mode.

(20) The liquid crystal display of any one of Items (15) to (17), wherein the liquid crystal cell is driven by an OCB mode.

The optical film of the present invention exhibits an optical anisotropy. In the optical film described in Items (1) to (7), the N value varies depending on the depth from the surface. Therefore, the degree of freedom for controlling the birefringence of the optical film is considerably expanded comparing with a film having a constant N value independently on the depth. The optical film can be easily produced with low cost since the film has different N values accompanied with depth from the surface compared with a film prepared by pasting plural films each having different N values from each other.

The optical film described in Item (8) is useful as a protective film to be provided on the surface closer to the liquid crystal cell of one of the polarizing plates of an IPS mode liquid crystal display.

The cellulose acetate described in Item (9) and the polymers described in Item (11) are suitably usable as the main constituent of the optical film and the solvents described in Item (10) can be preferably used.

A liquid crystal display having a wide viewing angle can be obtained by using the polarizing plate described in Item (14) and the liquid crystal display described in Items (15) to (18).

The present invention will be described in detail below.

FIG. 1 shows a schematic drawing of transmission type liquid crystal display 9 according to the present invention. The liquid crystal display 9 contains a liquid crystal cell 7 and a pair of polarization plates 6a and 6b each provided on both surfaces of the liquid crystal cell. The liquid crystal cell contains a liquid crystal layer and upper and lower substrates supporting the liquid crystal layer; detailed drawing thereof is not shown. The polarizing plate 6a contains a polarizing element 2a and transparent protective films 1a and 1b arranged both sides of the polarizing element 2a and the polarizing plate 6b is constituted by a polarizing element 2b and transparent protective films 1c and 1d arranged both sides of the polarizing element 2b. The light transmitting axes of the polarizing plates 6a and 6b are each crossed at right angle with the rubbing axes 5a and 5b of the liquid crystal cell. The liquid crystal display considerably improved in the viewing angle can be obtained.

The transparent protective film 1b provided on the liquid crystal cell side of the polarizing element 6a corresponds to the first transparent protective film of the present invention and is constituted by the optical film of the present invention. The transparent protective film 1c provided on the liquid crystal cell side of polarizing element 6b corresponds to the second transparent protective film of the present invention.

As the transparent protective films 1a and 1d, the optical film of the present invention or other polarizing plate protective film may be used. Examples of commercially available preferable cellulose ester film include: KC8UX2M, KC4UX, KC5UX, KC4UY, KC8UY, KC10UDR, KC8UCR-3, KC8UCR-4, KC8UY-HA, KC8UX RHA, KC4UE, KC8UE, KC4FR, KC12UR, KC8-UCR5 (the above produced by Konica Minolta Opto, Inc.), FUJITAC TD80UF, FUJITAC T80UZ, FUJITAC T40UZ, and an antireflection film (Fuji Film CV CLEARVIEW UA, produced by Fuji Photo film Co., Ltd.).

The transparent protective films 1a and 1d preferably have a hard coat layer or an antiglare layer, thickness of which is 8-20 µm. For example, preferably usable are a polarizing plate protective film having a hard coat layer or an antiglare layer, for example, disclosed in JP-A Nos. 2003-114333, 2004-203009, 2004-354699 and 2004-354828. Further, the polarizing plate protective film preferably has an antireflection layer containing at least a low refractive index layer on the hard coat layer or the antiglare layer. Specifically preferably the low refractive index layer contains silica-hollow particles.

As above-described, in usual transmission type liquid crystal display, the crystal liquid cell is arranged between two polarizing plates and the liquid crystal cell is constituted by pouring the liquid crystal between the two substrates. Therefore, usual liquid crystal display has four sheets of the polarizing plate protective film. The optical film according to the present invention may be used for any of the four sheets of polarizing protective film. The optical film is particularly useful for the plastic film to be arranged between the polarizing element and the liquid crystal layer.

The optical film according to the present invention and the retardation plate, optical compensation sheet and polarizing plate using the optical film can be applied to the liquid crystal display driven in various modes. The modes include TN (Twisted Nematic), IPS (In-Plane Switching), FLC (Ferroelectric Liquid crystal), AFCL (Anti-ferroelectric Liquid Crystal), OCB (Optically Compensatory Bend), STN (Super Twisted Nematic), VA (Vertically Aligned), HAN (Hybrid Aligned Nematic) and ASM (Axially Symmetric Aligned Microcell). The liquid crystal display may be a transmission type, a reflective type and a semi-transmission type.

Figure 4:
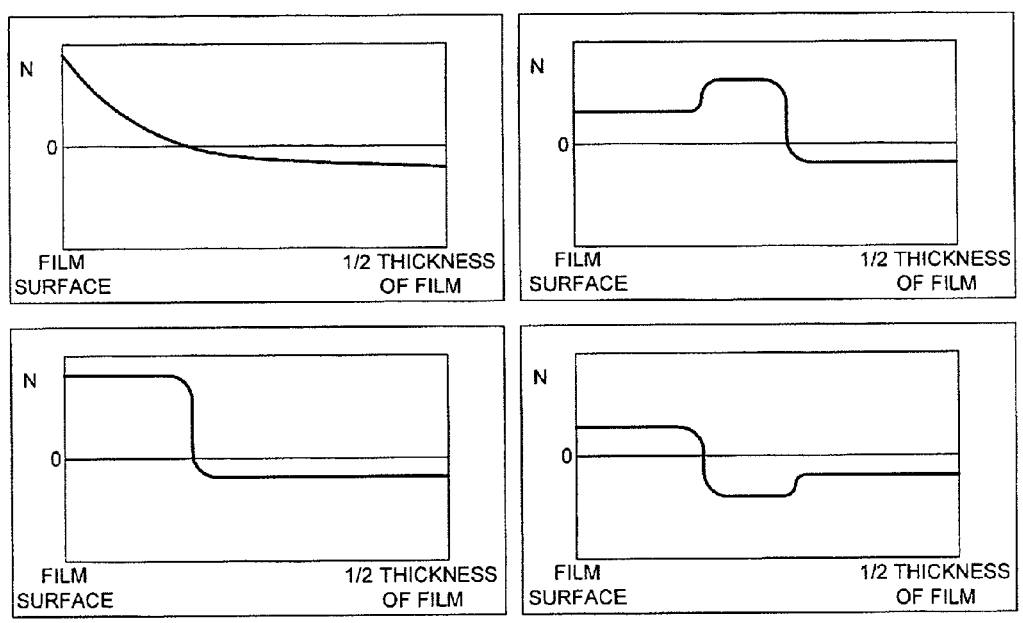
FIG. 4 illustrates profiles of an N value along the thickness direction of the optical film of the present invention.

The optical film of the present invention is described in detail below. With respect to the optical film of the present invention, the effect of the present invention is obtained when the specific values calculated from the refractive indexes at specific positions in the thickness direction of the optical film meet a prescribed relationship. The measurement of the refractive index is carried out using an automatic birefringence meter. As an automatic birefringence meter, cited is, for example, KOBRA-21ADH produced by Oji Scientific Instruments. The refractive index of the optical film of the present invention is measured at a wavelength of 590 nm under a condition of 23° C./55% RH. The refractive index at depth "a" from the surface of the film is measured by cutting out a slice of the optical film of the depth range of a−0.5 µm to a+0.5 µm and by measuring the refractive index of the slice of the film using an automatic birefringence meter. In the case of $a \leq 0.5$ µm, a slice of the film of 1 µm from the surface was cutout and measured by using an automatic birefringence meter. Accordingly, in the range of $a \leq 0.5$ µm, the refraction index is the same, and the calculated N value is also same. The average refractive index of the optical film in the depth range of a to b from the surface is obtained by cutting out a slice of the optical film in the depth range of a to b, and by measuring the refractive index using an automatic birefringence meter. An N value at an certain depth from the surface, for example N(a), and an average N value in a certain depth range, for example, N(0−a1), are calculated using the above described refractive indexes. In FIG. 4, examples of the profile of an N value along the thickness direction of the optical film are shown, however, the present invention is not limited thereto.

In order to obtain the prescribed relationship between the N values in the different depths from the surface, any one of the following methods are applicable: (i) a method to form plural films using dopes having different refractive indexes followed by adhering the films by dissolving the surfaces using a solvent; (ii) a method to co-casting plural dopes to simultaneously form a laminated film; (iii) a method to moisturize a film formed from a single dope to migrate the plasticized contained in the film along the thickness direction of the film;

(iv) a method to spray a liquid containing a plasticizer onto a film formed from a single dope, however, the present invention is not limited thereto.

The in-plane retardation value of the optical film of the present invention is preferably 0 to 10 nm, in order to obtain the effect of the present invention.

The measurement of the in-plane retardation value is carried out using an automatic birefringence meter. As an automatic birefringence meter, cited is, for example, KOBRA-21ADH produced by Oji Scientific Instruments. The refractive index of the optical film of the present invention is measured at a wavelength of 590 nm under a condition of 23° C./55% RH.

The optical film constituting the transparent protective film 1$b$ is a cellulose film. The cellulose film is a film containing a cellulose compound or a compound having a cellulose skeleton prepared by biometrically or chemically introducing a functional group to cellulose. Among them, a cellulose ester film is preferable, a cellulose acylate film is more preferable and cellulose acetate film is most preferable. Examples of the cellulose acetate include cellulose triacetate, cellulose diacetate, cellulose acetate butylate and cellulose acetate propionate.

The cellulose ester is an ester formed by cellulose and an acid. The acid for forming the ester is preferably an organic acid, more preferably a fatty acid having from 2 to 22 carbon atoms, further preferably a lower fatty acid having from 2 to 4 carbon atoms and most preferably acetic acids. The cellulose ester may be an ester formed from cellulose and plural kinds of acid. The cellulose acylate may be one substituted by plural acyl groups.

The cellulose acylate is an ester of cellulose and a carboxylic acid. In the cellulose acylate, hydrogen atoms being at position-2, -3 and -6 are entirely or partially substituted by an acyl group. Examples of the acid group include an acetyl group, a propionyl group, a butanoyl group, an isobutanoyl group, a t-butanoyl group, a heptanoyl group, a hexanoyl group, an octanoyl group, a decanoyl group, a dodecanoyl group, a tridodecanoyl group, a teradecanoyl group, a hexadecanoyl group, an octadecanoyl, a cyclohexanecarbonyl group, an oleoyl group, a benzoyl group, a naphthylcarbonyl group and a cinnamoyl group. The acetyl group, propionyl group, butanoyl group, dodecnoyl group, octadecanoyl group, t-butanoyl group, oleyl group, benzoyl group, naphthylcarbonyl group and cinnamoyl group are more preferable, and acetyl group is most preferable.

The substitution degree of the cellulose ester is preferably not less than 2.87, more preferably from 2.87 to 2.96, further preferably from 2.88 to 2.95, and most preferably from 2.90 to 2.95.

The polymerization degree of the cellulose ester is preferably from 200 to 700, more preferably from 250 to 400, and most reparably from 250 to 350, in viscosity average polymerization degree.

The viscosity of cellulose ester having low content of low molecular component is lower than that of usual cellulose ester even though the average molecular weight (polymerization degree) is high. The cellulose ester having low content of low molecular component can be obtained by removing the low molecular weight component from cellulose ester synthesized by the usual method. The low molecular weight component can be removed by washing the cellulose ester by a suitable organic solvent. The cellulose ester having low content of low molecular weight component can be synthesized. It is preferable for synthesizing the cellulose ester having low content of the low molecular weight component that the amount of sulfuric acid catalyst in the acetylation reaction is made to 0.5 from 25 parts by weight to 100 parts by weight of cellulose ester. Cellulose ester having preferable molecular weight distribution (a uniform molecular distribution) can be synthesized by making the amount of the sulfuric acid catalyst within the above range.

The material of the optical film according to the present invention is not limited to the cellulose ester film and a norbonene type polymer, a polycarbonate type polymer, a polyallylate type polymer, a polyester type polymer, a polysulfone type polymer, and a mixture of two or more kinds of such the polymer are usable.

The solvent is described below.

As the solvent for the cellulose ester, for example, a lower alcohol such as methyl alcohol, ethyl alcohol, n-propyl alcohol, iso-propyl alcohol and n-butyl alcohol, cyclohexane, dioxane, and a lower aliphatic hydrocarbon chloride such as methylene chloride are usable.

An example of preferable mixing ratio of the solvents is 70 to 95% by weight and 5 to 30% by weight of another solvent. The temperature of the system after addition of the solvent is preferably within the range of not less than the boiling point of the solvent and a temperature at which the solvent is not boiled, for example, a temperature of not less than 60° C. or from 80 to 110° C. is suitable. The pressure is decided so that the solvent is not boiled.

The solution was taken out from the vessel after cooled or pulled out from the vessel by a pump and cooled by a heat exchanger, and then supplied for forming a film.

The solvent is described in more detail below. The solvent of the cellulose ester solution is preferably an organic solvent and an organic solvent containing no chlorine atom.

The solvents containing no chlorine atom include an ester, a ketone, an ether, an alcohol and a hydrocarbon. The number of carbon tom of the organic solvent is preferably from 1 to 12. The ester, ketone, ether, alcohol and hydrocarbon each may have a branched or cyclic structure. A compound having two or more functional groups of the ester, ketone, ether and alcohol, namely —O—, —CO—, —COO— and —OH, can be used for the solvent. The hydrogen atom of the hydrocarbon moiety of the ester, ketone, ether and alcohol may be substituted by a halogen atom particularly a fluorine atom.

Examples of the ester having 2 to 12 carbon atoms include methyl formate, ethyl formate, propyl formate, pentyl formate, methyl acetate, ethyl acetate and pentyl acetate.

Examples of the ketone having 3 to 12 carbon atoms include acetone, methyl ethyl ketone, diethyl ketone, di-iso-butyl ketone, cyclopentanone, cyclohexanone and methylcyclohexanone.

Examples of the ether having 2 to 12 carbon atoms include di-iso-propyl ether, dimethoxymethane, dimethoxyethane, 1,4-dixane, 1,3-dioxoran, tetrahydrofuran, anisole and phenetole.

Examples of the alcohol having 1 to 12 carbon atoms include methanol, ethanol, 1-propanol, 2-propanol, 1-butanol, 2-butanol, t-butanol, 1-pentanol, 2-methyl-2-butanol, cyclohexanol, 2-flurethanol, 2,2,2-trifluoroethanol and 2,2,3,3-tetrafluoro-1-propanol.

Examples of the organic solvent having two or more functional group include 2-ethocyethyl acetate, 2-methoxyethanol, 2-butoxyethanol and methyl acetoacetate.

Examples of hydrocarbon compound having 6 to 12 carbon atoms include cyclohexane, hexane, benzene, toluene and xylene.

Particularly preferable organic solvent are methyl formate, ethyl formate, acetone, methyl ethyl ketone, cyclopentanone, cyclohexane, methanol, ethanol, 1-propanol, 2-propanol, 1-butanol, 2-butanol, cyclohexanol, methyl acetoacetate, hexane and cyclohexane.

Plural non-chlorine organic solvents may be used in combination.

Particularly preferable mixed solvent is a mixture of three or more kinds of solvent different from each other, and the first solvent is selected from the ester such as methyl acetate, ethyl acetate, methyl formate and ethyl formate, acetone and ether such as dioxoran and dioxane, the second solvent is selected from the ketone having 4 to 7 carbon atoms including an acetoacetate, and the third solvent is selected from the alcohol and hydrocarbon each having 1 to 10 carbon atoms. Furthermore, the fourth solvent may be used. The fourth solvent is also selected from the alcohol and hydrocarbon each having 1 to 10 carbon atoms. The third and fourth solvent is preferably the alcohols having 1 to 8 carbon atoms. When the first solvent is a mixture of two or more kinds of the solvent, the second solvent can be omitted. The first solvent is preferably selected from methyl acetate, acetone, methyl formate and ethyl formate. The second solvent is preferably selected from methyl ethyl ketone, cyclopentanone, cyclohexanone and methyl acetoacetate.

Examples of the alcohol as the third and fourth solvent are the same as the above-described alcohol.

The hydrocarbon compounds as the third and fourth solvent may have a cyclic or a branched structure. The hydrocarbon compound includes an aromatic hydrocarbon and an aliphatic hydrocarbon compound.

Examples of the hydrocarbon compound include cyclohexanone, hexane, benzene, toluene and xylene. The third and fourth solvents are each preferably selected from methanol, ethanol, 1-propanol, 2-propanol, 1-butanol, 2-butanol, cyclohexanol, cyclohexane and hexane, and more preferably from methanol, ethanol, 1-propanol, 2-propanol and 1-butanol.

The mixing ratio of the four kinds of the solvent is preferably from 20 to 95% by weight of the first solvent, from 2 to 60% by weight of the second solvent, and from 2 to 30% by weight of the sum of the third and fourth solvents. A mixture of from 30 to 90% by weight of the first solvent, from 2 to 50% by weight of the second solvent, and from 3 to 25% by weight of the sum of the alcohols as the third and fourth solvents is more preferable. Furthermore, a mixture of from 30 to 90% by weight of the first solvent, from 3 to 30% by weight of the second solvent, and from 3 to 15% by weight of the sum of the alcohols as the third and fourth solvents is most preferable. When the first solvent is a mixture and the second solvent is omitted, a mixture of from 30 to 90% by weight of the first solvent, a mixture of from 20 to 90% by weight of the first solvent, and from 5 to 30% by weight of the sum of the third and fourth solvents is more preferable, and a mixture of from 30 to 80% by weight of the first mixture solvent and from 7 to 25% of the sum of the third and fourth solvents is more preferable.

Additionally to the solvent for the cellulose ester, a plasticizer may be added to the solvent before or after dissolving the cellulose acetate by previously mixed with the solvent to form a solution or dispersion.

The plasticizer is preferably added for improving the mechanical properties, giving the softness, reducing the moisture permeation and controlling the retardation. For example, a phosphate and a carboxylate are preferably used for the plasticizer.

Examples of the phosphate include triphenyl phosphate, tricresyl phosphate and biphenyl diphenyl phosphate.

Examples of the carboxylate include a phthalate such as dimethyl phthalate, diethyl phosphate, dioctyl phthalate and diethyl hexyl phthalate, and a citrate such as acetyltriethyl citrate and acetyltributyl citrate. Other than the above, butyl oleate, methylacetyl ricinolate, dibutyl sebacate and triacetine are also usable. An alkylphthalylalkyl glycolate is also preferably used for this purpose. The alkyl group of the alkylphthalylalkyl glycolate is an alkyl group having 1 to 8 carbon atoms. Examples of the alkylphthalylalkyl glycolate include methylphthalylmethyl glycolate, ethylphthalylethyl glycolate, propylphthalylpropyl glycolate, butylphthalyl-butyl glycolate, octylphthalyloctyl glycolate, methyl-phthalylethyl glycolate, ethylphthalylmethyl glycolate, ethylphthalylpropyl glycolate, propylphthalylethyl glycolate, methylphthalylpropyl glycolate, methylphthalylbutyl glycolate, butylphthalylmethyl glycolate, butylphthalyethyl glycolate, propylphthalylbutyl glycolate, butylphthalyl-propyl glycolate, methylphthalyloctyl glycolate, ethyl-phthalyloctyl glycolate, octylphthalylmethyl glycolate and octylphthalylethyl glycolate. Methylphthalylmethyl glycolate, ethylphthalylethyl glycolate, propylphthalyl-propyl glycolate, butylphthalylbutyl glycolate and octylphthalyloctyl glycolate are preferably used. Two or more kids of the alakylphthalylalkyl glycolate may be used in a mixture state.

A poly-valent alcohol ester is also preferably used. The poly-valent alcohol plasticizer is a plasticizer composed of an ester of a di- or more-valent aliphatic alcohol and a monocarboxylic acid, and the ester preferably has an aromatic ring or a cycloalkyl ring in the molecule thereof. The polyvalent alcohol ester is preferably a 2- to 20-valent aliphatic alcohol ester.

The polyvalent alcohol to be used in the present invention is represented by the following formula 1.

$$R_1-(OH)_n \quad \text{Formula 1}$$

In the above, $R_1$ is an n-valent organic group, n is a positive integer of 2 or more, and OH is an alcoholic group and/or a phenolic hydroxyl group.

As preferable polyvalent alcohol, the followings can be exemplified but the present invention is not limited to them. Examples of the polyvalent alcohol include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolpropane, trimethylolethane and xylitol. Particularly, triethylene glycol, teraethylene glycol, diproylene glycol, tripropylene glycol, sorbitol, trimethylol propane and xylitol are preferred. For the monocarboxylic acid to be used in the polyvalent alcohol ester is not specifically limited and known aliphatic monocarboxylic acids, alicylic monocarboxylic acids and aromatic monocarboxylic acids are usable without specific limitation. The use of the alicyclic monocarboxylic acid or the aromatic monocarboxylic acid is preferable for improving the moisture permeability and reservation ability. Examples of preferable monocarboxylic acid are as follows but the present invention is not limited to them. As the aliphatic monocarboxylic acid, a fatty acid having a linear chain or a side chain containing from 1 to 32 carbon atoms are preferably used. The number of the carbon atom is more preferably from 1 to 20, and particularly preferably from 1 to 10. The use of acetic acid is preferable for raising the compatibility with the cellulose ester, and the use of a mixture of acetic acid and another monocarboxylic acid is also preferable. Examples of preferable aliphatic monocarboxylic acid include an saturated fatty acid such as acetic acid, propionic acid, butyric acid, valeric acid, capronic acid, enanthic acid, caprylic acid, pelargonic acid, capric acid, 2-ethyl-haxanoic acid, undecylic acid, lauric acid, dodecylic acid, myristic acid, pentadecylic acid, palmitic acid, heptacecylic acid, stearic acid, nonadecanic acid, arachinic acid, behenic acid, lignoceric acid, cerotic acid, heptacosanic acid, montanic acid, melissic acid and lacceric acid, and a unsaturated acid such as undecylenic acid, oleic acid, sorbic acid, linolic acid, linorenic acid and arachidonic acid. Examples of preferable alicyclic acid include cyclopentanic acid, cyclohexanic acid, cyclooctanic acid and their derivatives. Examples of preferable aromatic monocarboxylic acid include benzoic acid, one formed by introducing an alkyl group to the benzene ring of benzoic acid such as toluic acid, an aromatic monocarboxylic acid having two or more benzene rings such as biphenyl carboxylic acid, naphthalene carboxylic acid, tetralin carboxylic acid and their derivatives. Benzoic acid is particularly preferable. Though the molecular weight of the polyvalent alcohol is not specifically limited, a molecular weight of from 300 to 1,500 is preferable and that of from 350 to 750 is more preferable. A larger molecular weight is preferred since such the compound is difficultly evaporated, and a smaller molecular weight is preferable from the viewpoint of the haze and the compatibility. The carboxylic acid in the polyvalent alcohol ester may be used solely or in combination of two or more kinds thereof. The OH groups in the polyvalent alcohol may be entirely or partially esterized so as to remain a part of them.

The compound is preferably contained in an amount of from 1 to 30%, and more preferably from 1 to 20%, by weight of the cellulose ester. And the compound is preferably one having a vapor pressure at 200° C. of not more than 1,400 Pa for preventing bleeding out in the course of stretching and drying.

As another additive, polyester and polyether described in Tokkai 2002-22956, urethane resin described in Tokkai 2003-171499, rosin, rosin derivative, epoxy resin, ketone resin and toluenesulfonamide described in Tokkai 2002-146044, ester of polyvalent alcohol and carboxylic acid described in Tokkai 2003-96236, compounds represented by Formula 1 described in 2003-165868, and polyester and polyurethane described in Tokkai 2004-292696 can be added to the dope or fine particle dispersion.

The retardation of the cellulose ester film is the sum of the retardation originated in the cellulose ester film and that originated in the additive. Consequently, the retardation of the cellulose film can be reduced by adding an additive capable of disordering the orientation of the cellulose ester and is difficultly oriented itself and/or has a small polarizing anisotropy. For the additive capable of disordering the orientation of cellulose ester, an aliphatic compound is more preferable than an aromatic compound.

The concrete retardation reducing agent is, for example, polyesters represented by the following Formula 1 or Formula 2.

$$B_1\text{-}(G\text{-}A\text{-})_m G\text{-}B_1 \qquad \text{Formula 1}$$

$$B_2\text{-}(A\text{-}G\text{-})_n A\text{-}B_2 \qquad \text{Formula 2}$$

In Formulas 1 and 2, $B_1$ is a monocarboxylic acid component, $B_2$ is a monoalcohol component, G is a divalent alcohol component, A is a dibasic acid component; the compounds are synthesized by these components. The compounds are characterized in that each of $B_1$, $B_2$, G and A contains no aromatic ring. m and n are each a repeating number.

The carboxylic acid represented by $B_1$ is not specifically limited and known aliphatic monocarboxylic acids and alicyclic monocarboxylic acids can be used.

Preferable examples of the monocarboxylic acid are as follows but the present invention is not limited by them.

Aliphatic monocarboxylic acids having a straight or branched chain containing from 1 to 32 carbon atoms are preferably usable. Ones having carbon atoms of from 1 to 20 are more preferable and those having from 1 to 12 are particularly preferable. The presence of acetic acid is preferable for raising the compatibility with the cellulose ester and the mixing use of acetic acid and another monocarboxylic acid is also preferable.

Examples of preferable aliphatic monocarboxylic acid include an saturated fatty acid such as acetic acid, propionic acid, butyric acid, valeric acid, capronic acid, enanthic acid, caprylic acid, pelargonic acid, capric acid, 2-ethyl-haxanoic acid, undecylic acid, lauric acid, dodecylic acid, myristic acid, pentadecylic acid, palmitic acid, heptadecylic acid, stearic acid, nonadecanic acid, arachinic acid, behenic acid, lignoceric acid, cerotic acid, heptacosanic acid, montanic acid, melissic acid and lacceric acid, and a unsaturated acid such as undecylenic acid, oleic acid, sorbic acid, linolic acid, linorenic acid and arachidonic acid.

As the monoalcohol component represented by $B_2$, known alcohols can be used without any limitation. For example, aliphatic saturated alcohols and aliphatic unsaturated alcohols each having straight- or branched-chain containing from 1 to 32 carbon atoms are preferably used. The number of the carbon atoms is more preferably from 1 to 20 and particularly preferable from 1 to 12.

As the divalent alcohol component represented by G, the followings are exemplified but the present invention is not limited to them. Examples of the divalent alcohol include ethylene glycol, diethylene glycol, 1,2-propylene glycol, 1,3-propylene glycol, 1,2-butylene glycol, 1,3-butylene glycol, 1,4-butylene glycol, 1,5-pentanediol, 1,6-hexanediol, 1,5-pentylene glycol, triethylene glycol and tetraethylene glycol. Among them, ethylene glycol, 1,2-propylene glycol, 1,3-propylene glycol, 1,2-butylene glycol, 1,3-butylene glycol, 1,4-butylene glycol, 1,6-hexanediol, diethylene glycol and triethylene glycol are preferable. Moreover, 1,3-propylene glycol, 1,4-butylene glycol, 1,6-hexanediol and diethylene glycol are more preferable.

As the dibasic acid or dicarboxylic acid component represented by A, at least one selected from aliphatic dicarboxylic acids having from 4 to 12 carbon atoms such as malonic acid, succinic acid, glutaric acid, adipic acid, pimelic acid, sberic acid, azelaic acid, sebacic acid, undecanedicarboxylic acid and dodecanedicarboxylic acid. Two or more kinds of the dibasic acid may be used in combination.

The repeating number m and n in Formulas 1 and 2 is preferably from 1 to 170.

Another example of the retardation reducing agent is polyesters represented by Formula 3 or 4.

$$B_1\text{-}(G\text{-}A\text{-})_m G\text{-}B_1 \qquad \text{Formula 3}$$

$$B_2\text{-}(A\text{-}G\text{-})_n A\text{-}B_2 \qquad \text{Formula 4}$$

In Formulas 3 and 4, $B_1$ is a monocarboxylic acid component, $B_2$ is a monoalcohol component, G is divalent alcohol component having from 2 to 12 carbon atoms, and A is a dibasic acid having from 2 to 12 carbon atoms; the compounds are synthesized by these components. $B_1$, G and A each contains no aromatic ring. m and n are each repeating number. $B_1$ and $B_2$ are each the synonymous of $B_1$ and $B_2$ in Formula 1 or 2, respectively. G and A each represents the alcohol component and the dibasic acid component each having from 1 to 12 carbon atoms among the components represented by G and A in Formula 1 or 2, respectively.

The weight average molecular weight of the polyester is preferably not more than 20,000, and more preferably not more than 10,000. Particularly, the polyester having a weight average molecular weight of from 500 to 10,000 shows high compatibility with the cellulose ester and is not evaporated or volatilized in the course of film formation.

Polycondensation of the polyester is carried out by a usual method. For example, the polyester can be easily synthesized by a direct reaction of the dibasic acid and the glycol, a thermally fusing polymerization method by a polyesterizing reaction or a ester exchanging reaction of a methyl ester of the dibasic acid and the glycol, or a dehydrogen chloride reaction of an acid chloride of such the acid and the glycol. The polyester having a molecular weight not so large is preferably synthesized by the direct reaction. The polyester having high frequency on the low molecular weight side of the molecular weight distribution shows very high compatibility with the cellulose ester and the film having low moisture permeability and high transparence can be obtained. The molecular weight can be controlled by a usual method without any limitation. For example, the molecular weight can be controlled by controlling the amount of a mono-valent acid or alcohol in a method by blocking the terminal of the molecule terminal by a monovalent acid or monovalent alcohol. The use of the monovalent acid is preferable for the stability of the polymer. For example, acetic acid, propionic acid and butyric acid are usable. An acid is selected which is not distillated out from the reaction system in the course of the polycondensation reaction and easily distillated out when the monovalent acid is removed after stopping the reaction, and two or more of these acids may be used in combination. In the case of the direct reaction, the weight average molecular weight can be controlled by deciding the time of stopping the reaction according to the amount of water distillated out during the reaction. Other than the above, the weight average molecular weight can be controlled by biasing the using mole number of the glycol or the dibasic acid or by controlling the reaction temperature.

The polyester represented by Formula 1 or 2 is preferably contained in the cellulose ester in an amount of from 1 to 40% by weight, and that represented by Formula 3 or 4 is preferably contained in an amount of from 2 to 30% by weight. The content of from 5 to 15% by weight is particularly preferred.

As the retardation reducing agent other than the above, the retardation reducing agents and the optical anisotropy controlling agents described in Tokkai 2005-154764, the acryl type polymers described in Tokkai 2003-12859, the phosphate compounds described in Tokkai 2004-315605, the styrene oligomers and the benzyl methacrylate oligomers described in Tokkai 2005-105139, the polymers of styrene type monomer described in Tokkai 2005-105140, the ester compounds of glycerin type polyvalent alcohol and the fatty acids described in Tokkai 2000-63560, the esters or ethers of sugar alcohol of hexose described in 2001-247717, the triphosphate of a fatty acid alcohol described in Tokkai 2004-315613 and the compounds described in Tokkai 2005-41911 can be exemplified.

A UV absorbent, an antioxidant, a dye, a thermal stabilizer, an antistatic agent, a flame retardant, a slipping agent and an oily agent may be added into the dope.

An apparatus for producing the film in the embodiment of the present invention is described below.

In the embodiment of the present invention, the dope prepared by dissolving the cellulose ester in the solvent is cast on a support and heated for removing a part of the solvent and then peeled off from the support, and the peeled web is dried to obtain the cellulose ester film.

Figure 2:
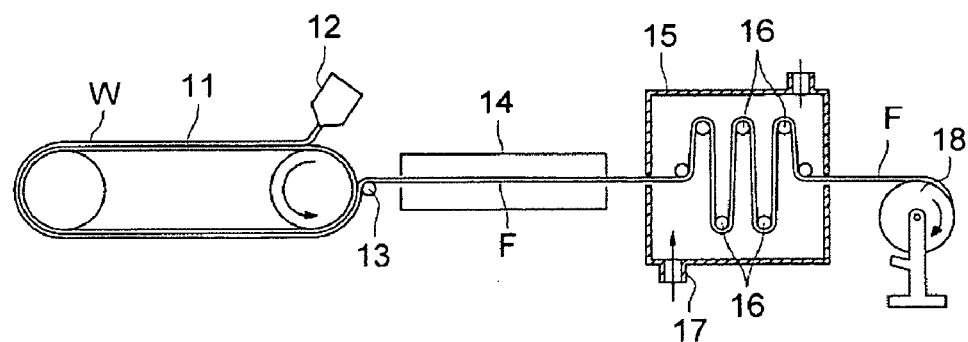
FIG. 2 shows a schematic side view of an embodiment of equipment for producing the optical film of the present invention.

The above process is described referring the drawings. As is shown in FIG. 2, the cellulose ester film producing equipment includes by a support 11 of a rotatable metal endless belt, a die 12 for casting the dope as the raw material of the cellulose ester film, a peeling roller 13 for peeling off a web W formed on the support 11 by the die 12, a tenter 14 for stretching and drying a film F peeled from the support 11 by holding the both edges portion in the traverse direction by many clips while transportating, a drying apparatus 15 for drying the film F by conveying through plural conveying rollers 16, and a winding roller 18 for taking up the cellulose ester film F obtained by the drying.

In the cellulose ester film producing equipment, the dope as the raw solution of the cellulose ester film is cast through the casting die 12 onto the support 11 constituted by the rotating metal endless belt. For the support 11, a stainless steel support with a mirror surface having a shape of belt as shown in FIG. 2 or a shape of drum is used. The layer of the dope or the web W formed on the support 11 by the casting is peeled by the peeling roller 13 after rounded about once on the support. The peeled film F is introduced into the tenter 14. The film is conveyed into the drying apparatus 15 after passing through the tenter 14. In the drying apparatus, the film is conveyed by the entire conveying rollers 16 arranged in staggering state in the housing by a roller-hang drying system, so as to be dried by drying air blown into the housing through an inlet 17. Thus the cellulose ester film F is obtained. Though any means can be applied for drying the film F without any limitation, hot air, infrared rays, a heating roller and microwaves are usually applied. The use of hot air is preferable from the viewpoint of simplicity. The main purpose of the drying is to evaporate the solvent remaining in the film, and the drying temperature is preferably from 100° C. to 150° C. and more preferably from 125° C. to 150° C. from the viewpoint of reducing the haze. When the drying temperature is less than 100° C., the evaporation rate of the solvent becomes very slow so that necessity of prolongation of the drying zone or slow down of the drying rate is resulted, such the situation is not preferable for the industrial production. Besides, the temperature exceeding 150° C. causes extremely softening of the film so that the high quality film can be hardly produced.

EXAMPLES

The examples of the optical film according to the present invention are described below together with comparative examples; the present invention is not limited to the examples.

First, Examples 1 through 5 and Comparative Examples 1 through 3 are described below. In Examples 1 through 5 and Comparative Examples 1 through 3, the N value varies accompanied with the depth from the surface by exposing the surface of the film to atmosphere of the plasticizer for permeating the plasticizer from the film surface.

TABLE 1

|  | N (a1) ($\times 10^{-4}$) | N (a2) ($\times 10^{-4}$) | a1 (μm) | a2 (μm) | Evaluation |
|---|---|---|---|---|---|
| Example 1 | 1.49 | −0.51 | 2 | 15 | 5 |
| Example 2 | 1.05 | −0.18 | 2 | 15 | 4 |
| Example 3 | 1.08 | −0.31 | 3 | 18 | 4 |
| Example 4 | 0.81 | −0.50 | 2 | 18 | 5 |

TABLE 1-continued

|  | N (a1) (×10⁻⁴) | N (a2) (×10⁻⁴) | a1 (μm) | a2 (μm) | Evaluation |
|---|---|---|---|---|---|
| Example 5 | 1.05 | 0.20 | 3 | 18 | 3 |
| Comparative Example 1 | 0.75 | 0.85 | 2 | 15 | 1 |
| Comparative Example 2 | −0.51 | 0.83 | 2 | 15 | 1 |
| Comparative Example 3 | −0.20 | −0.18 | 3 | 18 | 2 |

Example 1

Polymer 1

Methyl acrylate 10 parts by weight
2-hydroxyethyl acrylate 1 part by weight
Azobisisobutylonitrile 2 parts by weight
Toluene 30 parts by weight The above composition was put into a four mouth flask (the mouths were each used for an inlet opening, a thermometer, a reflux cooler, an inlet for nitrogen and a stirrer, respectively) and gradually heated by 80° C. and polymerized for 5 hours while stirring. After the polymerization, the polymer solution was poured into a large amount of methanol for forming precipitation. The precipitation was purified by washing by methanol and dried. Thus Polymer 1 having a weight average molecular weight of 2,000 was obtained.

<Dope Composition>

Cellulose triacetate (Substitution degree: 2.88)
100 parts by weight
Polymer 1 15 parts by weight
Tinuvin 326 TINUVIN 326 (being a UV absorber produced by CIBA®) 2 parts by weight
Methylene chloride 475 parts by weight
Ethanol 50 parts by weight The above dope components were put one by one into a sealed pressure vessel and heated by 70° C. so as to make the pressure in the vessel to one or more atmospheres, and the cellulose triacetate is completely dissolved while stirring. The dope was cooled by 35° C. and stood for one night, and then filtered through Azumi Filter Paper No. 24, manufactured by Azumi Roshi Co., Ltd., and defoamed by further standing for one night. After that, the dope was successively filtered through Finemet NM (absolute filtering precision: 100 μm) and Finepore NF (constituting three filters each having absolute filtering precision of 50 μm, 15 μm and 5 μm in the filtering order), each manufactured by Nihon Seisen Co., Ltd., applying a pressure of $1.0 \times 10^6$ Pa, and supplied for casting.

<Preparation of Cellulose Ester Film>

The filtered dope was cast at 35° C. by the belt casting apparatus to form a film. The organic solvent was evaporated so that the amount of remaining solvent became to 25% by weight before the belt was rounded about once and the web was peeled off from the belt. The time from the casting to peeling was 3 minutes. After the peeling, the web was clipped at the both edges thereof and conveyed and dried at 120° C. while holding the width of the web, and the web was released from the clips and dried at a temperature of from 120 to 135° C. while running through plural rollers arranged in zigzags in the roller drying apparatus. After drying, the cooled film was subjected to a knurling treatment to form knurls of a width of 10 mm and a height of 5 μm at both of the edge portions and then wound up by applying an initial and final winding tension of 150 N/width and 100 N/width, respectively. The size of thus obtained cellulose acetate film was 40 μm in thickness, 3,000 m in length and 1,300 mm in width.

<Spraying of Plasticizer>

A methylene chloride solution of trimethylolpropane tribenzoate was sprayed for 30 seconds onto the both sides of the above obtained cellulose acetate film and the film was held for 10 minutes at 150° C.

Example 2

Example 2 was carried out in the same manner as in Example 1 except that the amount of Polymer 1 was changed to 7.5 parts by weight and the time for spraying was changed.

Example 3

Example 3 was carried out in the same manner as in Example 1 except that the amount of Polymer 1 was changed to 10 parts by weight.

Example 4

Example 4 was carried out in the same manner as in Example 1 except that the amount of Polymer 1 was changed to parts by weight.

Example 5

Example 5 was carried out in the same manner as in Example 1 except that the amount of Polymer 1 was changed to 2.5 parts by weight.

Comparative Example 1

Dope Composition

Cellulose triacetate (Substitution degree: 2.88)
100 parts by weight
Trimethylolpropane tribenzoate
10 parts by weight
Tinuvin 326 TINUVIN 326 (being a UV absorber produced by CIBA®) 2 parts by weight
Methylene chloride 475 parts by weight
Ethanol 50 parts by weight A dope was prepared in the same manner as in Example 1 and cast onto the belt casting apparatus to form a cellulose acetate film.

<Spraying of Plasticizer>

A methylene chloride solution of Polymer 1 was sprayed for 30 seconds onto the both sides of the above obtained cellulose acetate film and the film was held for 10 minutes at 150° C.

Comparative Example 2

Comparative Example 2 was carried out in the same manner as in Comparative Example 1 except that cellulose acetate film was held at 150° C. for 10 minutes after splaying the plasticizer.

Comparative Example 3

Comparative Example 3 was carried out in the same manner as in Comparative Example 1 except that the spraying time of the plasticizer was changed to 50 minutes and the cellulose acetate film was held at 150° C. for 30 minutes after splaying the plasticizer.

The values of N(a1) and N(a2) of each of the films of Examples 1 to 5 and Comparative Examples 1 to 3 were measured. Measured results are listed in Table 1. For measuring the values of N(a1) and N(a2), portions of the film of from (a1−0.5) μm to (a1+0.5) μm and (a2-0.5) μm to (a2+0.5) μm from the surface were sampled, respectively, and $N_x$, $N_y$ and $N_z$ of each of the portions were measured. The $N_x$, $N_y$ and $N_z$ were measured at a wavelength of 590 nm and in an atmosphere of 23° C. and 55% RH using an automatic birefringence meter KOBRA-21ADH, manufactured by Ooji Keisokukiki Co., Ltd. It is understood from the measured data that the N(a1) and N(a2) can be varied by varying the time for spraying the plasticizer.

A polyvinyl alcohol film having a thickness of 120 μm was soaked in a 100 kg of aqueous solution containing 1 kg of iodine and 4 kg of boric acid, followed by stretching in a ratio of 6 times at 50° C. to form a polarizing film 6a. As the first transparent protective film 1b of the polarizing film 6a, which is provided closer to the liquid crystal cell, the optical films of examples 1-5 and comparatives 1-3. Each optical film was subjected to alkaline saponification followed by adhering to a polarizing plate using a 5% aqueous solution of fully-saponified polyvinyl alcohol as a glue. As a transparent protective film 1a, KC8UX-RHA (produced by Konica Minolta Opto, Inc.) was used which was adhered in the same manner as the optical film of the present invention.

As the second transparent protective film 1c of the polarizing film 6a, a film having Re2=250 nm and Rt2=5 nm, and KC8UX-RHA (produced by Konica Minolta Opto, Inc.) was used as 1d. Thus obtained polarizing plates were adhered to the glass surfaces of the liquid crystal cell of an IPS mode liquid crystal display FACE 23LC100 (23 inches, produced by TOSHIBA CORPORATION), the polarizing plates originally utilized being preliminarily removed.

An image displayed on each of thus obtained liquid crystal displays was observed at an angle of 45° to the normal line of the front surface of the liquid crystal display and at 360° around the normal line. The degree of stability of the observed image depending on the viewing angle was evaluating by ranking into 5 ranks. The results are listed in Table 1. In "Evaluation" in Table 1, 5 is the highest rank and the evaluation ranking is lowered in order of 4, 3 and 2, and 1 is the lowest rank.

Examples 1 to 5 satisfied the condition of the following Expression 1.

$$N(a1) \geq N(a2) \quad \text{Expression 1}$$

Therefore, Examples 1 to 5 all gave high ranks of 3 or more. Comparative Examples did not satisfy the above Expression 1 and their evaluation results were each not higher than 2.

Examples 6 to 8 and Comparative Example 4 are described below. In Examples 6 to 8 and Comparative Example 4, N value varied accompanied with the depth from the surface by co-casting plural kinds of Dopes 1 and 2.

TABLE 2

|  | N (a1) (×10⁻⁴) | N (a2) (×10⁻⁴) | a1 (μm) | a2 (μm) | Evaluation |
|---|---|---|---|---|---|
| Example 6 | 1.36 | −0.35 | 3 | 15 | 5 |
| Example 7 | 1.32 | −0.38 | 3 | 15 | 5 |
| Example 8 | 1.15 | −0.49 | 1 | 16 | 5 |
| Comparative Example 4 | −0.14 | 0.98 | 3 | 15 | 1 |

Example 6

Dope 1

Cellulose triacetate (Substitution degree: 2.88)
100 parts by weight
Trimethylolpropane tribenzoate
10 parts by weight
Tinuvin 326 TINUVIN 326 (being a UV absorber produced by CIBA®) 2 parts by weight
Methylene chloride 475 parts by weight
Ethanol 50 parts by weight Dope 2

Cellulose triacetate (Substitution degree: 2.88)
100 parts by weight
Polymer 1 15 parts by weight
Tinuvin 326 TINUVIN 326 (being a UV absorber produced by CIBA®) 2 parts by weight
Methylene chloride 475 parts by weight
Ethanol 50 parts by weight The above dope compositions 1 and 2 were each treated in the same processes as in Example 1 to obtain Dopes 1 and 2.
<Preparation of Cellulose Ester Film>

Dope 1, Dope 2 and Dope 1 were successively cast in this order on the belt casting apparatus to form a film. Thus an optical film was obtained in which a layer of Dope 1 of 7 μm, a layer of Dope 2 of 26 μm and a layer of Dope 1 of 7 μm were piled up in this order from the surface, and the total thickness after dried was 40 μm.

Example 7

Dope 1, Dope 2 and Dope 1 were successively cast in this order on the belt casting apparatus to form a film. Thus an optical film was obtained in which a layer of Dope 1 of 5 μm, a layer of Dope 2 of 30 μm and a layer of Dope 1 of 5 μm were piled up in this order from the surface, and the total thickness after dried was 40 μm.

Example 8

Dope 1, Dope 2 and Dope 1 were successively cast in this order on the belt casting apparatus to form a film. Thus an optical film was obtained in which a layer of Dope 1 of 3 μm, a layer of Dope 2 of 34 μm and a layer of Dope 1 of 3 μm were piled up in this order from the surface, and the total thickness after dried was 40 μm.

Comparative Example 4

Dope 2, Dope 1 and Dope 2 were successively cast in this order on the belt casting apparatus to form a film. Thus an optical film was obtained in which a layer of Dope 1 of 5 μm, a layer of Dope 2 of 30 μm and a layer of Dope 1 of 5 μm were piled up in this order from the surface, and the total thickness after dried was 40 μm.

The films of Examples 6 to 8 and Comparative Example 4 were evaluated in the same manner as in Examples 1 to 5 and Comparative Examples 1 to 3. The results of the evaluation are listed in Table 2.

Examples 6 to 8 satisfied Expression 1 and the evaluation ranks of them were all 5. On the other hand, Comparative Example 4 did not satisfy Expression 1 and the rank of it was 1.

Next, Examples 9 to 13 and Comparative Examples 5 to 7 are described. In Examples 9 to 13 and Comparative Examples 5 to 7, the N value varied accompanied with the depth from the surface of the film by spraying the plasticizer to the film in common with Example 1 but the composition of the dope was different from that in Example 1.

TABLE 3

|  | N (0-a1) (×10⁻⁴) | N (a2-a3) (×10⁻⁴) | a1 (μm) | a2 (μm) | a3 (μm) | N (0-a1)/ (a2-a3) | Re (nm) | Evaluation |
| --- | --- | --- | --- | --- | --- | --- | --- | --- |
| Example 9 | 1.52 | −0.34 | 2 | 8 | 15 | −4.5 | 2 | 5 |
| Example 10 | 1.21 | −0.15 | 2 | 8 | 15 | −8.1 | 1 | 4 |
| Example 11 | 1.10 | −0.28 | 3 | 10 | 18 | −3.9 | 2 | 5 |
| Example 12 | 0.67 | −0.52 | 2 | 10 | 18 | −1.3 | 1 | 5 |
| Example 13 | 0.65 | −0.10 | 3 | 6 | 18 | −6.5 | 5 | 3 |
| Comparative Example 5 | 0.75 | 0.85 | 2 | 8 | 15 | 0.9 | 4 | 1 |
| Comparative Example 6 | −0.51 | −0.18 | 2 | 8 | 15 | 2.8 | 2 | 2 |
| Comparative Example 7 | −0.14 | 0.98 | 3 | 6 | 15 | −0.1 | 3 | 1 |

Example 9

Polymer 2

Methyl acrylate 12 parts by weight
Azobis(2-hydroxyethyl butylate)
2.4 parts by weight
Toluene 30 parts by weight The above composition was polymerized, precipitated and purified in the similar manner as in Polymer 1 to obtain Polymer 2 having a weight average molecular weight of 2,000.

Dope Composition

Cellulose triacetate (Substitution degree: 2.88)
100 parts by weight
Polymer 2 15 parts by weight
Tinuvin 326 TINUVIN 326 (being a UV absorber produced by CIBA®) 2 parts by weight
Methylene chloride 475 parts by weight
Ethanol 50 parts by weight A dope was prepared form the above composition in the same manner as in Example 1 and formed to a cellulose triacetate film by casting the dope by the belt casting apparatus.

<Spraying of Plasticizer>

A methylene chloride solution of trimethylolpropane tribenzoate was sprayed onto both sides of the above obtained film for 30 minutes and then the temperature was raised by 150° C. and kept for 10 minutes.

Example 10

Example 10 was carried out in the same manner as in Example 9 except that the spraying time was changed to 25 seconds and then the temperature was raised 150° C. and kept for 15 minutes.

Example 11

Example 11 was carried out in the same manner as in Example 9 except that the spraying time was changed to 20 seconds.

Example 12

Example 12 was carried out in the same manner as in Example 9 except that the spraying time was changed to 15 seconds.

Example 13

Example 13 was carried out in the same manner as in Example 9 except that the spraying time was changed to 15 seconds and then the temperature was raised 150° C. and kept for 15 minutes.

Comparative Example 5

Comparative Example 5 was carried out in the same manner as in Example 9 except that Polymer 2 in the dope composition was replaced by 5 parts by weight of trimethylolpropane tribenzoate.

Comparative Example 6

Comparative Example 6 was carried out in the same manner as in Example 9 except that the amount of Polymer 2 in the dope composition was changed to 2 parts by weight.

Comparative Example 7

Dope Composition

Cellulose triacetate (Substitution degree: 2.88)
100 parts by weight
Trimethylolpropane tribenzoate
10 parts by weight
Tinuvin 326 TINUVIN 326 (being a UV absorber produced by CIBA®) 2 parts by weight
Methylene chloride 475 parts by weight
Ethanol 50 parts by weight A dope was prepared form the above composition in the same manner as in Example 1 and formed to a Cellulose Triacetate Film 2 by casting the dope by the belt casting apparatus.

<Spraying of Plasticizer>

A methylene chloride solution of Polymer 2 was sprayed onto both sides of Cellulose Triacetate Film 2 for 30 minutes and then the temperature was raised by 150° C. and kept for 10 minutes.

The values of N(0-a1) and N(a2-a3) of the films of Examples 9 to 13 and Comparative Examples 5 to 7 were measured. The measured results are listed in Table 3. For measuring the values of N(0–a1) and N(a2–a3), portions of the film of from 0 μm to a1 μm and from a2 μm to a3 μm from the surface were sampled, respectively, and $N_x$, $N_y$ and $N_z$ of each of these portions were measured. The $N_x$, $N_y$ and $N_z$ were measured at a wavelength of 590 nm and in an atmosphere of 23° C. and 55% RH using the foregoing automatic birefringence meter.

Liquid crystal displays were constituted by applying each of the films of Examples 9 to 13 and Comparative Examples of 5 to 7 as the first transparent protective film 1b on the side of the liquid crystal cell of the polarizing plate 6a and using a film prepared by fixing a liquid crystal compound in an oriented state on the optical film of Example 1 as the support to make the values of $Re_2$ and $Rt_2$ to 210 nm and 3 nm, respectively, as the second transparent protective film 1c on the liquid crystal cell side of the polarizing plate 6c. An image displayed on each of thus obtained liquid crystal displays was observed at an angle of 45° to the normal line of the front surface of the liquid crystal display and at 360° around the normal line. The degree of stability of the observed image depending on the viewing angle was evaluating by ranking into 5 ranks. The results are listed in Table 3. In "Evaluation" in Table 3, 5 is the highest rank and the evaluation ranking is lowered in order of 4, 3 and 2, and 1 is the lowest rank.

Examples 9 to 13 satisfied the following Expressions 2 and 3.

$$N(0\ to\ a1) \geqq N(a2\ to\ a3) \quad \text{Expression 2}$$

$$-10 < N(0\ to\ a1)/N(a2\ to\ a3) < 0 \quad \text{Expression 3}$$

Therefore, Examples 9 to 13 gave all good evaluation rank of 3 or more. Comparative Examples 5 and 6 did not satisfy Expressions 2 and 3 and Comparative Example 7 did not satisfy Expression 2 and the evaluation ranks of them were all 2 or less.

The values of retardation in plane Re of Examples of 9 to 13 were all within the range of from 0 nm to 5 nm. In the case of the protective film for the polarizing plate of the liquid crystal display driven in the IPS mode, the retardation in plane is preferably from 0 to 10 nm and particularly suitable from 0 to 5 nm. Therefore, the films of Examples 9 to 13 were each suitable for the protective film on the liquid crystal cell side of one of the polarizing plate in the liquid crystal display driven in the IPS mode. The retardation in thickness direction is preferably from –5 nm to 5 nm and more preferably about –5 nm. The film having $Re_2$ of from 150 nm to 300 nm and $Rt_2$ of from –20 nm to 20 nm was used as the second transparent protective film.
Therefore, the liquid crystal display driven in the IPS mode can be provided in which the light leaking in the oblique direction can be considerably reduced and high contrast at wide viewing angle can be obtained.

Examples 14 to 16 and Comparative Examples 8 and 9 are described below.

TABLE 4

| | N (0) ($\times 10^{-4}$) | N (a) ($\times 10^{-4}$) | a (μm) | N (a)/N (0) | Evaluation |
|---|---|---|---|---|---|
| Example 14 | 1.71 | –0.31 | 15 | –0.2 | 5 |
| Example 15 | 1.05 | –0.50 | 15 | –0.5 | 4 |
| Example 16 | 0.06 | –0.49 | 18 | –8.2 | 4 |
| Comparative Example 8 | 1.71 | 0.25 | 15 | 0.1 | 1 |
| Comparative Example 9 | –0.31 | –0.25 | 15 | 0.8 | 2 |

Example 14

Example 14 was carried out in the same manner as Example 3 except that the time for spraying the plasticizer was changed to 45 seconds.

Example 15

Example 15 was carried out in the same manner as Example 1 except that the time for spraying the plasticizer was changed to 20 seconds.

Example 16

Example 16 was carried out in the same manner as Example 1 except that the time for spraying the plasticizer was changed to 90 seconds.

Comparative Example 8

Example 8 was carried out in the same manner as Comparative Example 2 except that the temperature was raised to 150° C. after the spraying the plasticizer and held for 30 minutes.

Comparative Example 9

Example 8 was carried out in the same manner as Comparative Example 3 except that the time for spraying the plasticizer was changed to 60 seconds.

The values of N(0) and N(a) of the films of Examples 14 to 16 and Comparative Examples of 8 and 9 were measured. For measuring the values of N(0) and N(a), portions of the film of from 0 μm to 0.5 μm and from (a–0.5) μm to (a+0.5) μm from the surface were sampled, respectively, and $N_x$, $N_y$ and $N_z$ of each of these portions were measured. The $N_x$, $N_y$ and $N_z$ were measured at a wavelength of 590 nm and in an atmosphere of 23° C. and 55% RH using the foregoing automatic birefringence meter.

Liquid crystal displays were constituted by applying each of the films of Examples 14 to 16 and Comparative Examples of 8 and 9 as the first transparent protective film 1b on the side of the liquid crystal cell of the polarizing plate 6a and using a film having $Rt_2$ of 210 nm and $Re_2$ of 3 nm constituting by providing a liquid crystal compound layer on the optical film Of Example 1 as the second transparent protective film 1c on the liquid crystal cell side of the polarizing plate 6c. An image displayed on each of thus obtained liquid crystal displays was observed at an angle of 45° to the normal line of the front surface of the liquid crystal display and at 360° around the normal line. The degree of stability of the observed image depending on the viewing angle was evaluating by ranking into 5 ranks. The results are listed in Table 4. In "Evaluation" in Table 3, 5 is the highest rank and the evaluation ranking is lowered in order of 4, 3 and 2, and 1 is the lowest rank.

Examples 14 to 16 satisfied the conditions of the following Expressions 4 and 5.

$$N(0) \geqq N(a) \quad \text{Expression 4}$$

$$-1 \leqq N(0)/N(a) < 0 \quad \text{Expression 5}$$

Therefore, Examples 14 to 16 gave all good evaluation rank of 4 or more. Comparative Examples 8 did not satisfy Expression 5 and Comparative Example 9 did not satisfy Expressions 4 and 5, and the evaluation ranks of them were all 2 or less.

Examples 17 to 19 and Comparative Example 10 are described below. The optical films of Examples 17 to 19 and Comparative Example 10 were prepared in the same manner as the optical films of Examples 6 to 8 and Comparative Example 4, respectively, except that the width of the film was changed from 1800 mm to 2500 mm. Determination of the N values were carried out at the center portion and the portions 50 mm inside from the left and right edges of each optical film, using the optical films of Examples 17 to 19 and Comparative Example 10 together with the optical films of Examples 6 to 8 and Comparative Example 4. The evaluation of the liquid crystal display was carried out at the center portion and the left and right edge portions of each optical film. Table 5 summarizes the results obtained for the optical films of Examples 6 to 8 and Comparative Example 4, and Table 6 summarizes those of Examples 17 to 19 and Comparative Example 10. In Tables 5 and 6, ΔN represents the difference between the N value at the center portion and the N value at the left or right edge portion of the optical film. The evaluation criteria of he liquid crystal display were the same as described above.

TABLE 5

|  | ΔN (a 1) | | ΔN (a 2) | | Evaluation | | |
| --- | --- | --- | --- | --- | --- | --- | --- |
|  | Left | Right | Left | Right | Left | Center | Right |
| Example 6 | −0.02 | −0.01 | −0.01 | 0.00 | 5 | 5 | 5 |
| example 7 | +0.01 | 0.00 | +0.01 | −0.01 | 5 | 5 | 5 |
| Example 8 | +0.01 | −0.01 | 0.00 | +0.01 | 5 | 5 | 5 |
| Comparative Example 4 | +0.22 | +0.13 | −0.20 | +0.19 | 2 | 1 | 1 |

TABLE 6

|  | ΔN (a 1) | | ΔN (a 2) | | Evaluation | | |
| --- | --- | --- | --- | --- | --- | --- | --- |
|  | Left | Right | Left | Right | Left | Center | Right |
| Example 17 | 0.00 | +0.01 | +0.01 | 0.00 | 5 | 5 | 5 |
| example 18 | −0.01 | +0.01 | 0.00 | +0.01 | 5 | 5 | 5 |
| Example 18 | −0.01 | +0.01 | 0.00 | −0.01 | 5 | 5 | 5 |
| Comparative Example 10 | +0.32 | −0.13 | −0.40 | +0.39 | 2 | 1 | 1 |

Tables 5 and 6 revealed that, the optical film of the present invention provides stable N values regardless of the positions in the lateral direction of the optical film, even when the film width becomes larger.

Figure 3:
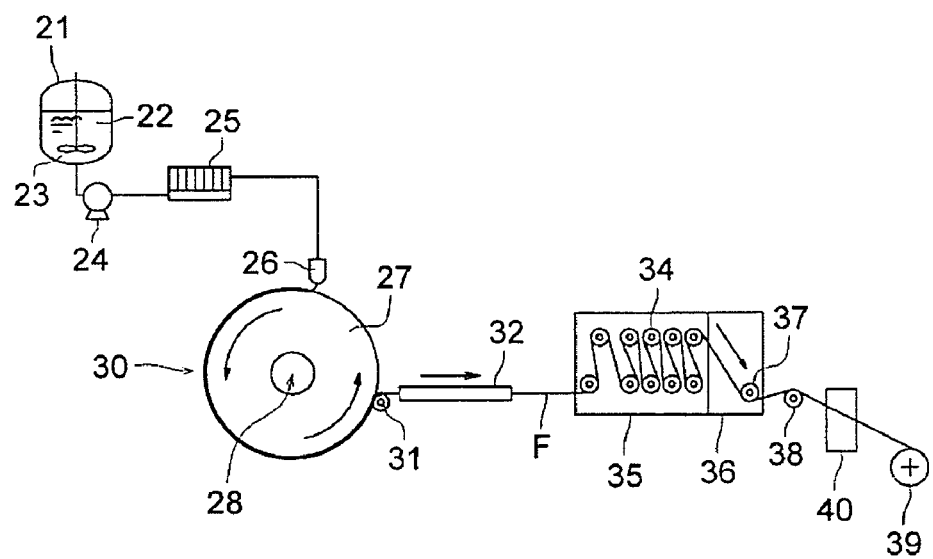
FIG. 3 shows a schematic side view of another embodiment of equipment for producing the optical film of the present invention.

In the above examples, the case of producing the optical film by the belt casting film forming apparatus is described, but the film forming method is not limited to the belt casting method and, for example, a drum casting method also can be applied. FIG. 3 shows a schematic drawing of equipment of the drum casting film forming method. A dope charged in a mixing tank 21 is stirred and made uniform by a stirring wing 23. The dope 22 was transported by a pump 24 to a filtering apparatus 25 for removing impurities and sent to casting die 26 in a constant flow rate, and cast in a casting drum 27. The casting drum 27 is kept at a temperature of not more than 5° C. by a thermal controlling apparatus 28. The dope is cooled and dried for a time of not less than 5 seconds to form a gel layer 30 having self holding ability. Accordingly, the surface temperature of the casting drum 27 is preferably from −50° C. to −10° C. The cooled and solidified gel layer 30 is peeled off by a peeling roller 31 and immediately conveyed into a tenter 32. On this occasion, the gel layer contains the solvent in an amount of 200 to 300% by weight to the solid component. The gel layer is stepwise dried until the content of the solvent becomes 100% by weight. The gel layer is held by the tenter 32 at the both side edges thereof and dried while applying tension. The gel layer 30 is dried by heating while applying the tension is output in a form of a film F. The film F is further dried in a drying zone 35 having plural rollers 34 and cooled while being conveyed in a cooling zone 36 by a roller 37. The film output from the cooling zone 36 is conveyed by a roller 38 and, through a film checker 40, wound up by a winding machine 39.

In the above examples, the method by exposing the film surface to the atmosphere containing the plasticizer for permeating the plasticizer near the film surface and the method by co-casting the plural kinds of dope are described as the method for varying N value accompanied with the depth of from the film surface. Other than the above methods, such the purpose can be also attained by a method using a plasticizer having high volatility and a method by rapidly drying the film surface.

What is claimed is:

1. An optical film having an inner portion exhibiting an N value defined by the following equation smaller than an N value at a surface of the optical film:

$N=(nx+ny)/2-nz,$ wherein nx represents an in-plane refractive index in a slow axis direction of the optical film, ny represents an in-plane refractive index in a fast axis direction of the optical film, and nz represent a refractive index in a thickness direction of the optical film, wherein the N value is calculated from the refractive indices nx, ny, and nz at a depth "a" from the surface of the optical film, wherein nx, ny, and nz at the depth "a" are measured by cutting out a slice of the optical film of the depth range of (a−0.5) μm to (a+0.5) μm using an automatic birefringence meter, provided that, in the case of a≦0.5 μm, a slice of a depth of 1 μm from the surface of the optical film is cut out to measure the refractive indices, wherein the optical film meets the following conditions:

$N(0)≧N(a);$ $-10≦N(0)/N(a)<0;$ and $0<a≦d/2,$ and wherein a represents a depth from the surface of the optical film;
d represents a thickness of the optical film;
N(0) represents an N value at a depth 0 from the surface; and
N(a) represents an N value at a depth a from the surface.

2. The optical film of claim 1, wherein Re value of the optical film is 0 to 10 nm, Re representing an in-plane retardation value defined by the following equation:

$Re=(nx-ny)×d$ wherein nx represents an in-plane refractive index in a slow axis direction of the optical film; ny represents an in-plane refractive index in a fast axis direction of the optical film; and d represents a thickness of the optical film.

3. The optical film of claim 1 comprising a cellulose ester.

4. The optical film of claim 3, wherein the optical film is formed using a solution comprising at least one of the solvents selected from the group consisting of an ether having 3 to 12 carbon atoms in the molecule, a ketone having 3 to 12 carbon atoms in the molecule and an ester having 3 to 12 carbon atoms in the molecule.

5. The optical film of claim 1 comprising at least one of the polymers selected from the group consisting of polynorbornene, polycarbonate, polyacrylate, polyester and polysulfone.

6. The optical film of claim 1, wherein the optical film is produced by a solution casting method, and
wherein a width of the optical film is 1.4 to 4.0 m.

7. A method to produce an optical film comprising the steps of: casting a dope comprising a polymer and a solvent on a support to form a gel film having a self-standing nature; and peeling the gel film from the support, forming the optical film of claim 1.

8. A polarizing plate, comprising:
a polarizing film; and
transparent protective films provided on both surfaces of the polarizing film, wherein one of the transparent protective films is the optical film of claim 1.

9. A liquid crystal display, comprising:
a liquid crystal cell comprising a liquid crystal layer and a pair of substrates provided on both surfaces of the liquid crystal layer; and
a pair of polarizing plates provided on both surfaces of the liquid crystal cell, each of the polarizing plates comprising a polarizing film and transparent protective films provided on both surfaces of the polarizing film,
wherein a transparent protective film of one of the polarizing plates is the optical film of claim 1, the transparent protective film being provided closer to the liquid crystal cell than the other transparent protective film.

10. The liquid crystal display of claim 9, wherein the liquid crystal cell is driven by an IPS mode.

11. The liquid crystal display of claim 9, wherein the liquid crystal cell is driven by a VA mode.

12. The liquid crystal display of claim 9, wherein the liquid crystal cell is driven by an OCB mode.

13. A liquid crystal display, comprising:
a liquid crystal cell comprising a liquid crystal layer and a pair of substrates provided on both surfaces of the liquid crystal layer; and
a pair of polarizing plates provided on both surfaces of the liquid crystal cell, each of the polarizing plates comprising a polarizing film and transparent protective films provided on both surfaces of the polarizing film,
wherein a first transparent protective film is the optical film of claim 1, the first transparent protective film being provided on a surface closer to the liquid crystal cell of one of the pair of polarizing plates, and
wherein a second transparent protective film exhibits an in-plane retardation value: Re2, represented by the following equation, of 150 to 300 nm, and a retardation value in the thickness direction: Rt2, represented by the following equation, of −20 to 20 nm, the second transparent protective film being provided on a surface closer to the liquid crystal cell of the other polarizing plate:

$$Re2=(nx2-ny2){\times}d2, \text{ and}$$

$$Rt2=((nx2+ny2)/2-nz){\times}d2$$

wherein
nx2 represents an in-plane refractive index in a slow axis direction of the second transparent protective film,
ny2 represent an in-plane refractive index in a fast axis direction of the second transparent protective film,
nz2 represent a refractive index in a thickness direction of the second transparent protective film, and
d2 represents a thickness of the second transparent protective film.

14. A liquid crystal display, comprising:
a liquid crystal cell comprising a liquid crystal layer and a pair of substrates provided on both surfaces of the liquid crystal layer; and
a pair of polarizing plates provided on both surfaces of the liquid crystal cell, each of the polarizing plates comprising a polarizing film and transparent protective films provided on both surfaces of the polarizing film,
wherein a first transparent protective film is the optical film of claim 1, the first transparent protective film being provided on a surface closer to the liquid crystal cell of one of the pair of polarizing plates,
wherein a second transparent protective film exhibits an in-plane retardation value Re2 represented by the following equation of 150 to 300 nm, and a retardation value in the thickness direction Rt2 represented by the following equation of −20 to 20 nm, the second transparent protective film being provided on a surface closer to the liquid crystal cell of the other polarizing plate, and
wherein the second transparent protective film comprises the optical film of claim 1 as a substrate having thereon a liquid crystal compound, the orientation of the liquid crystal compound being fixed:

$$Re2=(nx2-ny2){\times}d2, \text{ and}$$

$$Rt2=((nx2+ny2)/2-nz){\times}d2$$

wherein
nx2 represents an in-plane refractive index in a slow axis direction of the second transparent protective film,
ny2 represent an in-plane refractive index in a fast axis direction of the second transparent protective film,
nz2 represent a refractive index in a thickness direction of the second transparent protective film, and
d2 represents a thickness of the second transparent protective film.

15. An optical film having an inner portion exhibiting an N value defined by the following equation smaller than an N value at a surface of the optical film:

$$N=(nx+ny)/2-nz,$$

wherein nx represents an in-plane refractive index in a slow axis direction of the optical film, ny represents an in-plane refractive index in a fast axis direction of the optical film, and nz represents a refractive index in a thickness direction of the optical film;
an N value is calculated from the refractive indices nx, ny, and nz at depth "a" from the surface of the optical film; and
nx, ny, and nz at depth "a" are measured by cutting out a slice of the optical film of the depth range of a−0.5 μm to a+0.5 μm using an automatic birefringence meter,
provided that, in the case of a≦0.5 μm, a slice of a depth of 1 μm from the surface of the optical film was cutout to measure the refractive indices,
wherein the optical film meets the following conditions:

$$N(0-a1)>N(a2-a3),$$

$$0<a1{\leqq}a2{\leqq}a3{\leqq}d/2, \text{ and}$$

$$-10<N(0-a1)/N(a2-a3)<0, \text{ and}$$

wherein
a1, a2 and a3 each represent a depth from the surface of the optical film while 0 represents a depth of the surface, d represents a thickness of the optical film, N(0–a1) represents an average N value in a depth range of 0 to a1 from the surface, and N(a2–a3) represents an average N value in a depth range of a2 to a3 from the surface.

16. An optical film having an inner portion exhibiting a first N value and a second N value defined by the following equation smaller than an N value at a surface of the optical film:

$N=(nx+ny)/2-nz,$ wherein nx represents an in-plane refractive index in a slow axis direction of the optical film, ny represents an in-plane refractive index in a fast axis direction of the optical film, and nz represent a refractive index in a thickness direction of the optical film;

the first N value and the second N value are calculated from the refractive indices nx, ny, and nz at depth "a" from the surface of the optical film; and nx, ny, and nz at depth "a" are measured by cutting out a slice of the optical film of the depth range of a−0.5 μm to a+0.5 μm using an automatic birefringence meter, provided that, in the case of a≦0.5 μm, a slice of a depth of 1 μm from the surface of the optical film was cutout to measure the refractive indices, wherein a thickness of the optical film is not less than 15 μm, the first N value is in a depth range of more than 0 but less than 5 μm from the surface of the optical film and is 0 to $5\times10^{-4}$, and the second N value is in a depth range of 5 μm or more from the surface of the optical film and is $-5\times10^{-4}$ to 0.

* * * * *